United States Patent [19]

Gyarmati et al.

[11] Patent Number: 4,917,843
[45] Date of Patent: Apr. 17, 1990

[54] PROCESS FOR JOINING MOLDED SILICON NITRIDE PARTS

[75] Inventors: Ernö Gyarmati, Jülich, Fed. Rep. of Germany; Xiliang Qiu, Beijing, China

[73] Assignee: Kernforschungsanlage Jülich Gesellschaft mit beschränkter Haftung, Julich, Fed. Rep. of Germany

[21] Appl. No.: 115,775

[22] Filed: Oct. 30, 1987

[51] Int. Cl.$^4$ ............................................. C04B 35/58
[52] U.S. Cl. ...................................... 264/60; 264/62; 264/332
[58] Field of Search .......................... 264/60, 332, 62

[56] References Cited

PUBLICATIONS

Johnson et al, Proc. 2nd Int. Conf. on Ceramic, Glass & Metal Joints, Mar. 27–29, 1985, Deutschen Keramischen Gesellschaft, pp. 109–125.
Gyarmati et al, Proc. 2nd, Int. Symp. on Ceramic Materials & Components for Engines, Apr. 14–17, 1986, Lubeck-Travemüade, pp. 449–457.
Perry et al, Proc. 8th Int. Conf. on Chemical Vapor Deposition, 1981, Electrochemical Society, Pennington, N.J., pp. 475–488.
Laers et al, Prod. 8th Int. Conf. on Chemical Vapor Deposition, 1981, Electrochemical Society, Pennington, N.J. pp. 723–736.
Qiu et al, Composition and Properties of $Si_3N_4$ Films Produced by Reactive RP. Magnetron Sputtering, Thin Solid Films 1987, pp. 223–233.

*Primary Examiner*—James Derrington
*Attorney, Agent, or Firm*—Frishauf, Holtz, Goodman & Woodward

[57] ABSTRACT

For joining shaped bodies of silicon nitride together, silicon nitride surfaces to be joined are first polished and then put into an apparatus for applying sputtered layers where they are first cleaned by ion bombardment in argon, followed immediately by sputtering with silicon in a nitrogen atmosphere such that a layer is deposited having a nitrogen content exceeding the $Si_3N_4$ stoichiometric ratio. This readily provides a layer of the composition $Si_3N_{5.5}$. A complementary nitrogen deficient layer is also provided in the joint before hot pressing, either in the form of a silicon layer that goes between the nitrogen-rich silicon nitride layers or in the form of a nitrogen-deficient silicon nitride layer sputtered onto a polished silicon nitride surface at relatively low nitrogen pressure. The parts are isostatically hot pressed together at 1500° to 1750° C. in a nitrogen atmosphere. The layers which are usually thinner than 1 $\mu$m interact, with the disappearance of excess nitrogen and silicon, so that once the joint is produced all traces of jointure tend to disappear. The presence of a small amount of $Y_2O_3$ at the joint has a favorable effect.

22 Claims, No Drawings

PROCESS FOR JOINING MOLDED SILICON NITRIDE PARTS

The invention concerns a process for joining together by hot pressing molded parts having a silicon nitride surface at least in the region of the joint, in which process polished surfaces to be joined with or without an interposed silicon layer, are bonded together at pressures of at least 10 MPa and temperatures above 1300° C.

Various processes are known for joining $Si_3N_4$ ceramic parts. These can in a general way be subdivided into two groups of processes which respectively operate with and without addition of other (foreign) matter.

In the first group is a joining process in which the bonding of molded parts made of isostatically hot pressed silicon nitride (HPSN) or reaction bonded $Si_3N_4$ (RBSN) is intended to be obtained by nitriding an interposed silicon disk. According to another process, the bond between HPSN or RBSN ceramics is produced by hot pressing(HP) or isostatic hot pressing (HIP) with an interposed layer of $Si_3N_4$ powder or an interposed RBSN disk. After isostatic hot pressing, bending strength values up to 276 MPa at room temperature are obtained.

In the second group, there are processes using intermediate layers of individual metals, alloys, oxide compounds, glasses, etc. Thus, for example, $Si_3N_4$ bodies having a disk interposed between them consisting of W, Mo, Cr or Co are bonded together by pressure welding. The products thus obtained, however, show the formation of cracks in the boundary layer. The joining of the $Si_3N_4$ bodies with the help of successive graduated layers of $Si_3N_4$ and W powders has seemed more promising: In this case, a faultless bond with shear strengths from 100 to 200 MPa was obtained.

Various solders have been mentioned in the literature for insertion between $Si_3N_4$ workpieces to produces a joint. Active solders or brazing compounds made from the elements Ag, Ti, Zr, Be, Cu, etc. have been found useful in this regard. The eutectics thereby formed indeed have good wetting properties, but the temperature stability of such compositions is small, however.

Substantial strength values were successfully reached by means of glasses of the $SiO_2+Al_2O_3+Y_2O_3$ or $SiO_2+Al_2O_3+MgO$ compositions. The $Si_3N_4$ surface reacted with the glass melts at temperatures around 1600° C. (pressure: 200 KPa; time: 45 minutes). The $Si_2N_2O$ thereby formed grew out from the $Si_3N_4$ surface into the weld seam. At the same time, the melt diffused along the grain boundaries into the $Si_3N_4$. Up to 800° C. a 4-point bending strength ($\sigma_{4B}$) of ~450 MPa was measured. With rise of the temperature, this value grew still further, but at 1000° C. it nevertheless sank to zero. $Si_3N_4$ was bonded in accordance with another process by means of $SiO_2+CaO+TiO_2$ glasses. Breaking strength experiments showed, however, that the $\sigma$ values of the joint seam that was about 20 μm thick did not go above 280 MPa.

These joining processes, whether worked with or without a foreign substance in the region of the joint, are not fully satisfactory, because either no convincingly good bond is obtained or else the nitriding cannot be obtained uniformly over the entire region of the joint, or else a weakening of the boundary layer is to be expected particularly on account of the effect of temperature on strength.

SUMMARY OF THE INVENTION

It is accordingly an object of the invention to provide a process by which a uniformly good bond of the molded parts can be obtained across and beyond the joint region, a bond which is not subject to weakening in the joint seam as a result of the presence of foreign materials.

Briefly, at least on one of the surfaces to be joined a sputtered layer of silicon nitride is applied before hot pressing which has an excess of nitrogen in its composition and then, in hot pressing for joining the parts, measures are taken to provide a complementary nitrogen deficiency in the joint region.

In other words, in accordance with the invention, measures are taken to provide a nitrogen excess in the region of the boundary layers growing together and a nitrogen deficiency in the material itself, so that merely by reactive sorting out and diffusion into each other of the complementary layers, a growing together of the bodies can take place across the boundary layer, by which the seam practically vanishes.

The nitrogen excess is produced by building up an $Si_3N_{4+}$ layer by sputtering of silicon in a regulated nitrogen containing atmosphere. "Sputtering of silicon" is to be understood, in the context of the foregoing description, as also including plasma supported processes in which the silicon is brought forth in the reaction chamber either as such or in the form of a compound.

The corresponding nitrogen deficiency can be formed either by a surface layer consisting only of silicon or likewise by sputtering of an obtainable $Si_3N_{4-}$ layer. In particular, these layers or sputtered coatings provided on the finely polished surfaces of the molded bodies are thinner than about 2 μm, and layer thicknesses exceeding the value of the maximum surface roughness of the bodies to be bonded are of minor interest. Thicknesses in the region from 0.1 to 0.3 μm are particularly desired and sought.

The atomic composition of the sputtered layer which is built up by sputtering in nitrogen depends with relatively great sensitivity, on the nitrogen pressure that prevails during the sputtering of the silicon, and, in fact, especially in the deficiency region while an approximate saturation is established in the nitrogen excess region, all of which leads more or less to compositions corresponding to $Si_3N_{5.5}$, so that the building up of these same nitrogen-excess silicon nitride layers seems particularly practical.

It further seems useful to provide immediately on top of such nitrogen-excess layers a deposit of silicon of about half the thickness, so that later when two analogously pretreated molded bodies are joined, a growing together across the location of the joint seam can be obtained by melting together and interpenetrating reaction.

Good results are also obtained, however, by generating a nitrogen-deficiency layer of the composition $Si_3N_{2.5}$ which is complementary to the $Si_3N_{5.5}$. Such a nitrogen deficiency layer can be obtained by sputtering silicon in a correspondingly reduced (rarefied) nitrogen atmosphere.

The formation of such silicon nitride sputtered layers by silicon sputtering is in itself known and the desired production of a nitrogen excess or of a nitrogen deficiency, dependent upon the prevailing nitrogen pressure and the other conditions, such as absolute pressure, spacing between sputtering electrode and substrate, applied voltage, etc., can be determined directly and simply by a preliminary run of the operation. In particular, and by way of example, nitrogen pressures in the region from $10^{-3}$ to $10^{-1}$ mbar are useful and applied voltages between a few hundred volts and durations of sputtering between 10 and 100 minutes.

Further details of experimental information regarding sputtering nitrogenous silicon films are published in our article in Thin Solid Films (1987), pp. 223-233.

Immediately before the application of such sputtered layers, the surfaces to be joined are preferably cleaned by "bombardment" with argon ions ("argon-etched").

The joining procedure is carried out most successfully at temperatures in the region from 1500 to 1750° C. and pressures applied to press the parts together are preferably in the region from 10 to 30 MPa, for application for 20 to 120 minutes or somewhat more in a press which is evacuated and flushed with $N_2$.

When $Si_3N_4$ molded parts of HPSN material are used which have been produced with addition of a small amount of $Y_2O_3$, yttrium oxide present in the surface appears to have an effect as an aide to consolidation.

The invention will now be described by way of illustration with reference to an example of performance of the process.

EXAMPLE

Preparation of Samples

Prismatic samples measuring $12 \times 12 \times 5$ mm or $16.3 \times 1.3 \times 5$ mm (both sizes have been used in this example) were polished at their faces which were to be joined ($12 \times 12$ mm or $16.3 \times 16.3$ mm as the case may be). These samples were of HP quality $Si_3N_4$ obtained from the Hertel-International firm in Germany. The polished samples, before the application of layers thereto, were then cleaned in an ultrasonic bath and dried. Immediately before sputtering on of the $SiN_x$ layers, the polished surfaces were etched with $Ar^+$ ions in situ after having been installed in the sputtering apparatus through vacuum locks. Thin films were applied by reactive sputtering of a silicon target in the presence of $N_2$. For this purpose a sputtering apparatus with a planar HF magnetron cathode was used (Type Z 400 of the Leybold-Heraeus firm of Germany).

Joining of Samples

For joining together the $Si_3N_4$ samples, two varieties of layers were provided to the parts for different joining conditions, as the following table shows.

| Test No. | Joint layers produced by sputtering | Layer thickness μm | Temp. °C. | Time min | Pressing force MPa |
| --- | --- | --- | --- | --- | --- |
| 1 | $Si_3N_{5.5}/Si_3N_{2.5}$ | 0,3/0,3 | 1650 | 120 | 30 |
| 2 | $Si_3N_{5.5}/Si/Si/Si_3N_{5.5}$ | 0,2/0,1/0,1/0,2 | 1600 | 120 | 30 |

The sputtered pairs of samples were joined together in a laboratory hot press. During the pressing operation, the $Si_3N_4$ samples were located in a graphite guide structure in order to to prevent lateral shifting. For avoiding a chemical reaction between metallic pressing dies and the sample, the contact surfaces were isolated from each other by graphite cylinders or SiC disks. The press chamber was evacuated and flushed with $N_2$ several times before hot pressing. In each case an $N_2$ pressure of 40 KPa was established before pressing. The test samples were cut perpendicularly to the joint seam and then were examined with a light microscope as well as with an electron beam microsonde, by which it was established that the joint seam was no longer recognizable.

Although the invention has been described with reference to a particular example, it will be recognized that variations and modifications are possible within the inventive concept.

We claim:

1. Process for joining together, by hot pressing, first and second molded parts each having a silicon nitride surface at least in the portion of each said part which is intended to be joined to the other said part, comprising the steps of:

polishing at least said portions of said molded silicon nitride surfaces which are to be joined together, for reducing surface roughness;

applying sputtering a silicon nitride layer having a nitrogen content exceeding the $Si_3N_4$ stoichiometric ratio on at least one of said surface portions which are to be joined together, and hot pressing together said surface portions which are to be joined with provision between said surface portions of a complementary nitrogen deficiency relative to silicon for establishment of an at least approximate stoichiometric ratio of nitrogen to silicon in a and cross a resulting joint by diffusive migration during hot pressing.

2. Process as defined in claim 1, wherein a said silicon nitride layer having a nitrogen content exceeding the $Si_3N_4$ stoichiometric ratio, having an approximate composition of $Si_3N_{5.5}$ and having a thickness not greater than 1 μm, is applied on both of said surface portions which are to be joined together and the said provision between said surface portions of a complementary nitrogen deficiency relative to silicon is performed by providing a silicon layer of about half the thickness of said $Si_3N_{5.5}$ layer immediately adjoining each said $Si_3N_{5.5}$ layer before said surface portions are hot pressed together.

3. Process as defined in claim 1, wherein a said silicon nitride layer having a nitrogen content exceeding the $Si_3N_4$ stoichiometric ratio is applied by sputtering on said polished silicon nitride surface portion of said first molded part which is to be joined to said second molded part and there is applied by sputtering on the silicon nitride surface portion of said second molded part which is to be joined with said first molded part a nitrogen deficient silicon nitride layer of substantially the same thickness as said silicon nitride layer having excess nitrogen content, said silicon nitride layer having excess nitrogen content being applied under sputtering conditions producing an approximate layer composition of $Si_3N_{5.5}$ and said nitrogen deficient silicon nitride layer being applied under sputtering conditions producing an approximate layer composition of $Si_3N_{2.5}$ whereby said complementary nitrogen deficiency relative to silicon is established between said surface portions which are to be joined, both said layers being applied prior to hot pressing said polished silicon nitride surface portions of said respective molded parts together.

4. Process as defined in claim 3, wherein both said silicon nitride layer having excess nitrogen content and said nitrogen deficient silicon nitride layer have a thickness of about 0.3 μm.

5. Process as defined in claim 2, wherein both of said silicon nitride layers having an approximate composition of $Si_3N_{5.5}$ have a thickness of about 0.2 μm and wherein the total thickness of silicon interposed between them likewise has a thickness of about 0.2 μm.

6. Process as defined in claim 2, wherein said molded parts to be joined together are of silicon nitride containing $Y_2O_3$.

7. Process as defined in claim 3, wherein said molded parts to be joined together are of silicon nitride containing $Y_2O_3$.

8. Process as defined in in claim 4, wherein said molded parts to be joined together are of silicon nitride containing $Y_2O_3$.

9. Process as claimed in claim 1, wherein the step of applying a silicon nitride layer by sputtering is preceded by argon etching said polished silicon nitride surface portion on which a silicon nitride layer is to be applied, said argon etching being preferred by argon ion bombardment.

10. Process as defined in claim 1, wherein the step of hot pressing together said surface portions which are to be joined is performed at a temperature in the range from 1500 to 1750° C. and at pressures in the range from 10 to 30 MPa for from 20 to 120 minutes in a nitrogen atmosphere.

11. Process of joining together, by hot pressing, first and second molded parts each having a molded silicon nitride surface at least in the portion of each said part which is intended to be joined to the other said part, comprising the steps of:
polishing at least said portions of said molded silicon nitride surfaces which are to be joined together, for reducing surface roughness;
producing a relative nitrogen deficiency in the polished portions of said silicon nitride surfaces by sputtering thereon a coating less than 2um thick of composition $Si_3N_x$ in which x has a value from 0 to 3.9, inclusive;
applying by sputtering a silicon nitride layer having a nitrogen content exceeding the $Si_3N_4$ stoichiometric ratio on at least one of said nitrogen-deficient polished surface portions coated with said nitrogen-deficient silicon nitride coating, for providing a complementary nitrogen excess between said nitrogen-deficient polished surface portions, and then
hot pressing together said surface portions which are to be joined for establishment of an at least approximate stoichiometric ratio of nitrogen to silicon in and across a resulting joint by diffusive migration during hot pressing.

12. Process as defined in claim 11, wherein said composition $Si_3N_x$ of said coating of relative nitrogen deficiency is an approximate composition of $Si_3N_{2.5}$ and said coating is not more than 1 μm thick and wherein said silicon nitride layer having a nitrogen content exceeding $Si_3N_4$ has an approximate composition of $Si_3N_{5.5}$.

13. Process as defined in claim 12, wherein said silicon nitride layer of approximate composition $Si_3N_{5.5}$ is applied to both said nitrogen-deficient polished surface portions in a thickness not exceeding 1 μm in each case.

14. Process as defined in claim 13, wherein said layer having an approximate composition of $Si_3N_{5.5}$ is applied on each of said nitrogen-deficient polished surface portions has a thickness of about 0.2 μm.

15. Process as defined in claim 11, wherein said first and second molded parts are of silicon nitride containing $Y_2O_3$.

16. Process as defined in claim 11, wherein the step of producing a relative nitrogen deficiency in said polished silicon nitride surface portions by sputtering is preceded by argon etching the said polished molded silicon nitride surface portions which are to be joined together.

17. Process as defined in claim 11, wherein the step of hot pressing together said surface portions which are to be joined is performed at a temperature in the range from 1500 to 1750° C. and at pressures in the range from 10 to 30 MPa for from 20 to 120 minutes in a nitrogen atmosphere.

18. Process for joining together, by hot pressing, first and second molded parts each having a molded silicon nitride surface at least in the portion of each said part which is intended to be joined to the other said part, comprising the steps of:
polishing at least said portions of said molded silicon nitride surfaces which are to be joined together, for reducing surface roughness;
producing a relative nitrogen deficiency in the polished silicon nitride surface portion of said first molded part by sputtering thereon a coating less than 2 μm thick of composition $Si_3N_x$ in which x has a value from 0 to 3.9 inclusive;
applying by sputtering a silicon nitride layer having a nitrogen content exceeding the $Si_3N_4$ stoichiometric ratio on the nitrogen-deficient surface of said first molded part;
thereafter applying a coating less than 2 μm thick by sputtering a coating of composition $Si_3N_x$ in which x has a value from 0 to 3.9 inclusive on at least one of said surface portions which are to be joined, and then
hot pressing together said surface portions which are to be joined for establishment of an at least approximate stoichiometric ratio of nitrogen to silicon in and across a resulting joint by diffusive migration during hot pressing.

19. Process as defined in claim 18, wherein said composition $Si_3N_x$ of said coating sputtered onto the polished silicon nitride surface portion of said first molded part and the composition $Si_3N_x$ of said coating sputtered as the third sputtering step of said process are each not more than 1 μm thick, and wherein said silicon nitride layer having a nitrogen content exceeding $Si_3N_4$ has an approximate composition of $Si_3N_{5.5}$.

20. Process as defined in claim 18, wherein said first and second molded parts are of silicon nitride containing $Y_2O_3$.

21. Process as defined in claim 18, wherein the step of producing a relative nitrogen deficiency in said polished silicon nitride surface portion of said first molded part is preceded by argon etching of said polished surface portion of said first molded part.

22. Process as defined in claim 18, wherein the step of hot pressing together said surface portions which are to be joined is performed at a temperature in the range from 1500° C. to 1750° C. and at pressures in the range from 10 to 30 MPa for from 10 to 120 minutes in a nitrogen atmosphere.

* * * * *